May 18, 1954   C. EGGER   2,678,790
TILTING TOP FOLDING PIPE VISE STAND
Filed May 29, 1953   2 Sheets-Sheet 1
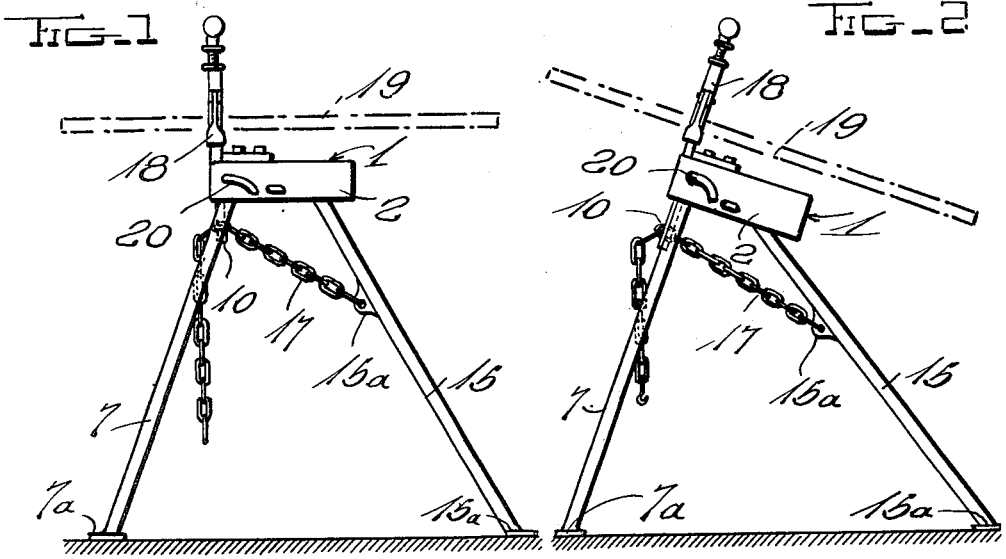
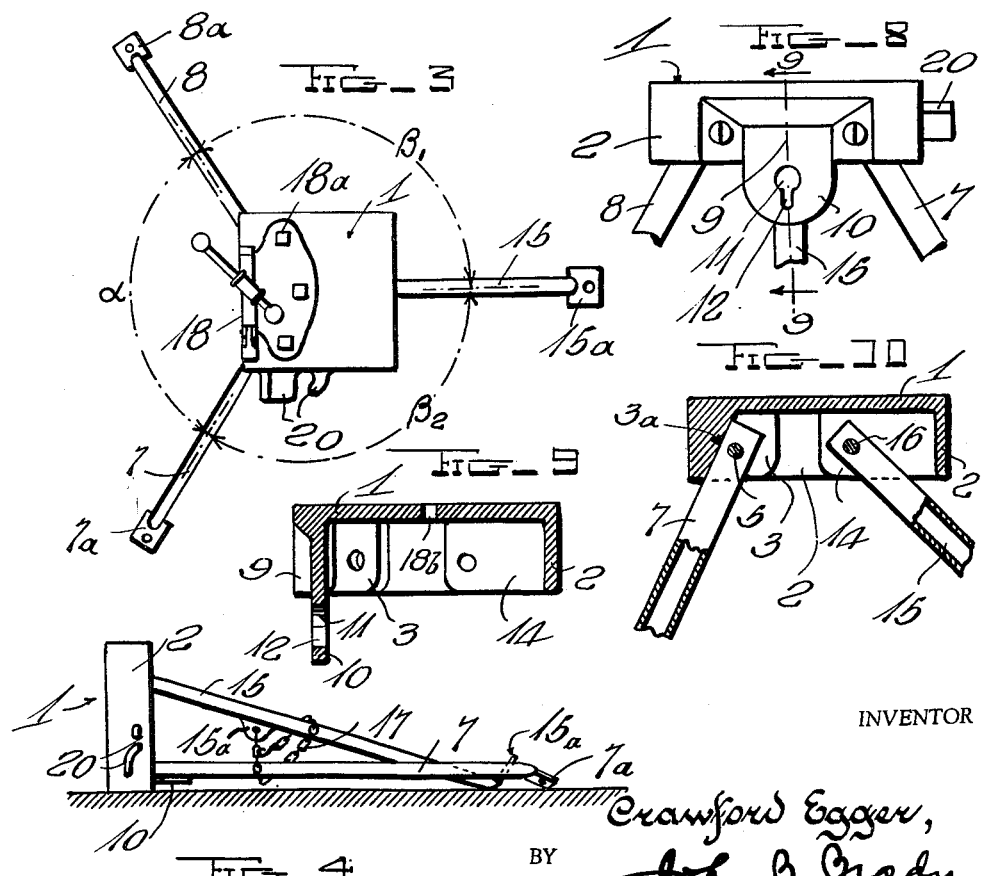
INVENTOR
Crawford Egger,
BY John B. Brady
ATTORNEY

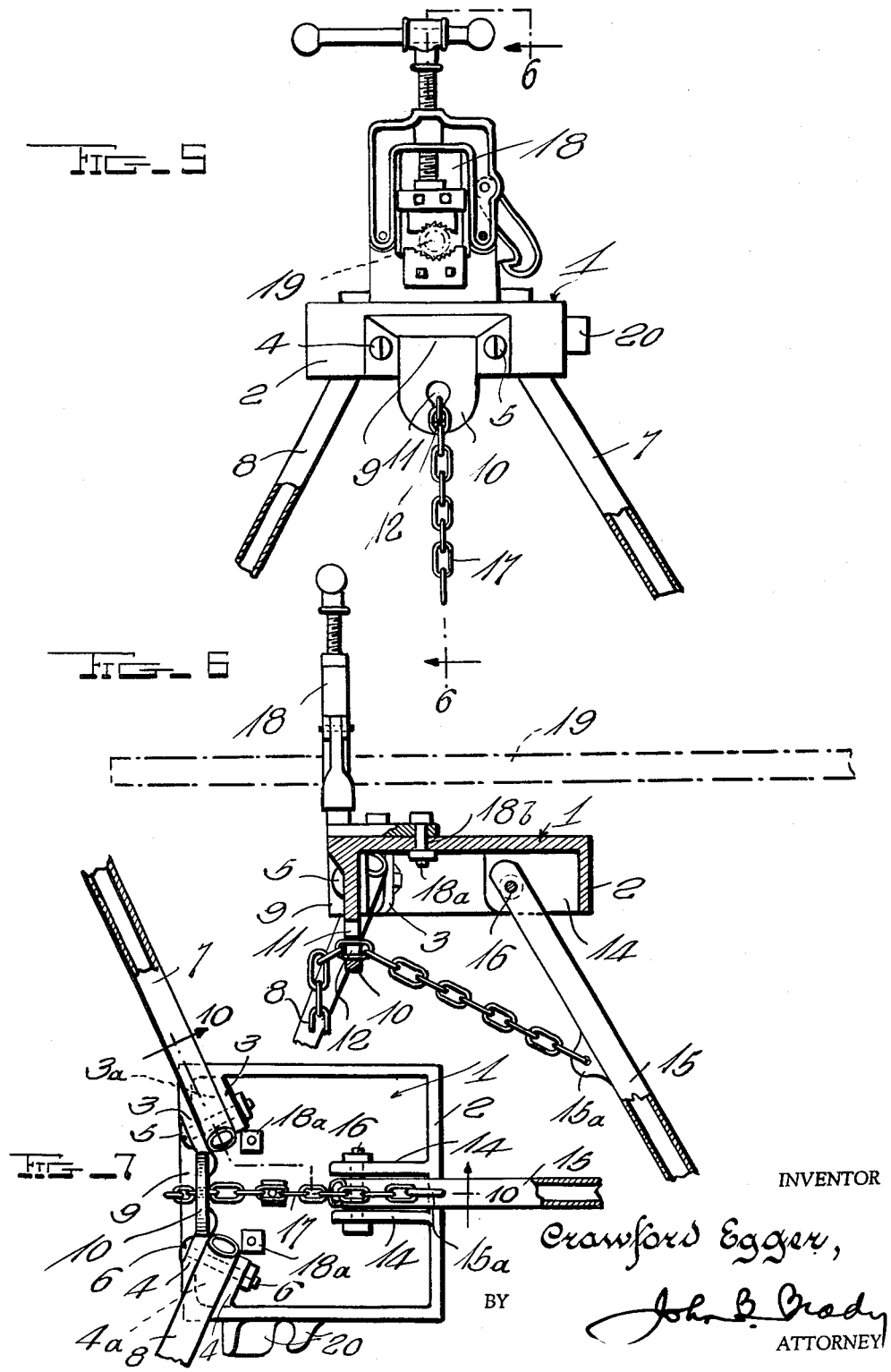

Patented May 18, 1954

2,678,790

UNITED STATES PATENT OFFICE 2,678,790

TILTING TOP FOLDING PIPE VISE STAND

Crawford Egger, Caledonia, Miss.

Application May 29, 1953, Serial No. 358,447

2 Claims. (Cl. 248—168)

My invention relates broadly to foldable and readily transportable pipe vice stands, particularly intended for use by plumbers and electricians, and more particularly to a readily adjustable pipe vice stand.

One of the objects of my invention is to provide a construction of adjustable pipe vice stand which may be readily foldable and conveniently transported and erected for use by plumbers and electricians in holding pipe in various angular positions for purposes of cutting and threading.

Another object of my invention is to provide a construction of portable foldable pipe vice stand having means for regulating the angular position of the top of the vice stand and adjusting the plane thereof in order to position the pipe at the proper angle to be cut or threaded.

Still another object of my invention is to provide a construction of foldable pipe vice stand having a pair of foldable legs at the front of the stand and an intermediate foldable leg at the rear of the stand where the intermediate foldable leg connects through an adjustable member which may be adjustably secured with respect to a depending portion of one side of the stand intermediate the aforesaid foldable legs for readily controlling the angle of tilt of the vice stand for presenting pipe gripped thereby in any desired angular position.

Still another object of my invention is to provide a readily foldable pipe vice stand having a pair of front legs and an intermediate rear leg, wherein the front legs are limited in their angle of spread by coaction with the underside of the pipe vice stand, and wherein the rear leg is spreadable under control of a latching chain adjustably secured with respect to the front of the pipe vice stand for latching the stand in any selected angular position most convenient for working upon pipe gripped in a vice carried by the stand.

Still another object of my invention is to provide a construction of three-leg mounting means for pipe vice stands in which two of the legs are spreadable to predetermined limits and wherein the third leg is adjustable in varying degrees with respect to the aforesaid legs for controlling the tilt angle of the top of the vice stand.

Other and further objects of my invention reside in the production of a readily adjustable pipe vice stand as set forth more fully in the specification hereinafter following by reference to the accompanying drawings, in which:

Figure 1 is a side elevational view of a pipe vice stand constructed in accordance with my invention and illustrating the top of the pipe vice stand maintained in a substantially horizontal plane;

Fig. 2 is a view similar to the view shown in Fig. 1, but illustrating the pipe vice stand adjusted to a plane tilting upwardly for positioning the pipe in the vice conveniently for working upon the pipe;

Fig. 3 is a top plan view of the vice stand of my invention maintained in a horizontal plane;

Fig. 4 is a view illustrating the pipe vice stand collapsed to folded position ready for transportation;

Fig. 5 is a fragmentary front elevational view of the pipe vice stand on an enlarged scale and illustrating the manner of latching the adjustable chain employed for controlling the spread of the third leg of the stand and correspondingly controlling the tilt of the stand;

Fig. 6 is a vertical longitudinal sectional view taken substantially on line 6—6 of Fig. 5, and illustrating the coaction of the legs of the stand with the top of the stand;

Fig. 7 is a fragmentary bottom view of the pipe vice stand showing the connection of the legs therewith;

Fig. 8 is a fragmentary front view of the pipe vice stand illustrating the latching slot at the front of the stand;

Fig. 9 is a transverse sectional view on line 9—9 of Fig. 8; and

Fig. 10 is a view illustrating the abutting relationship of the front legs with the underside of the stand and the adjustable relationship of the third leg of the stand with respect to the aforesaid legs.

My invention is directed to a portable pipe vice stand which may be readily folded into a compact collapsed package for transportation by a plumber or electrician and set up on the job for cutting and threading pipe or conduit. In order to accommodate the pipe vice stand to different conditions and to render the pipe vice stand most convenient to the operative, I provide a tripod arrangement terminating in a top support which may be tilted at any angle to support the pipe or conduit at a selected height and angle. The tripod support consists of two legs pivotally connected to the underside of the top or platform of the stand and spaced on a transverse angle greater than the transverse angles between the said legs and the third intermediate leg which is adjustably pivoted to the underside of the top or platform. The reason for this difference in transverse spacing of the legs is to provide adequate vertical working space for the turning of the handles of a cutting or threading die and to avoid any obstruction with respect to the lower portions of the front legs. The front legs coact with abutments on the underside of the tiltable top or platform. The third leg has a wide range of pivotal adjustment for changing the angular position of the top or platform. A link chain is pivotally connected with the third leg and extends through a slot in a depending lug formed integral with the front of the tiltable top or platform intermediate the front legs. The link chain extends through this slot and is latchable therein for maintaining the third leg in a selected setting with respect to the front legs. By moving the link chain out of the slot and reinserting another link of the link chain in the slot the angular position of the third leg may be changed for changing the tilting plane of the top or platform on which the pipe vice is mounted.

Referring to the drawings in more detail reference character 1 designates the tiltable top or platform of the pipe vice stand. The tiltable top or platform is rectangular in contour and the underside thereof is hollow bounded by an integral peripheral skirt 2. The underside of the tiltable top or platform is provided with sets of integral corner flanges 3 and 4 which are so spaced as to permit entry of the ends of the front tubular legs 7 and 8. The lower ends of legs 7 and 8 are flattened and terminate in feet 7a and 8a. The upper ends of the front legs 7 and 8 are pivotally mounted between sets of flanges 3 and 4 by means of bolts 5 and 6 which extend through the front of the skirt. Between each of the corner flanges 3 and 4 I provide a limiting abutment surface indicated, for example, at 3a for restricting the angular movement of the tubular leg 7, in Fig. 10. A corresponding limiting abutment surface 4a is provided for limiting the angular movement of tubular leg 8.

The front of the skirt 2 is recessed as represented at 9 and a depending lug 10 formed integral with the skirt 2 extends downwardly intermediate the sets of flanges 3 and 4 in which the front legs 7 and 8 are pivoted. The depending lug 10 includes a circular aperture 11 with a vertically disposed slot 12 depending therefrom.

The undersurface of the tiltable top or platform 1 is also provided with a pair of longitudinally extending spaced rear flanges 14 integral with the top or platform 1 for receiving the rear tubular leg 15. The lower end of rear leg 15 is flattened to provide a mounting foot 15a as shown. The rear tubular leg 15 is pivoted between the rear flanges 14 by means of pivot bolt 16. The pivot bolt 16 passes through the rear tubular leg 15 in a position sufficiently below the end of leg 15 to permit the rear leg 15 to swing freely beneath the top or platform to a position between the front legs 7 and 8, limited only by abutment in its forward movement with the end of depending lug 10 and in its rearward movement by abutment with the periphery of skirt 2. The rear leg 15 has a lug 15a on the front surface thereof directed toward the depending lug 10 at the front of the stand. A link chain 17 is pivotally connected in the lug 15a and is passed through the aperture 11 in depending lug 10, as shown more clearly in Figs. 1, 2, 6 and 7, and when a selected position for rear leg 15 is reached, the appropriate link of chain 17 is moved downwardly to latch in the slot 12, thereby maintaining the tiltable top or platform in a selected angular position.

The vice 18 is secured to the tiltable top or platform 1 by means of bolts 18a which pass through apertures 18b in the tiltable top or platform. The pipe or conduit 19 is gripped in the vice 18 and is moved to the position which will meet the convenience of the operative with respect to height and surrounding working conditions for insuring maximum efficiency of the use of a cutting or threading die. The tiltable top or platform 1 also includes a pipe-bending device 20 at one side of the skirt 2, as shown.

The spacing between the front legs 7 and 8 indicated by the angle $\alpha$ in Fig. 3, exceeds the transverse angular spacing between rear leg 15 and front leg 8, indicated at $\beta_1$, and the transverse angular spacing between rear leg 15 and front leg 7, indicated at $\beta_2$. This differential spacing insures adequate room for the rotation of the die handles even when the vice stand is used in the position illustrated in Fig. 1. As soon as the vice stand is tilted to a selected position, illustrated in Fig. 2, all obstruction between the handles of the tool and the front supporting legs is eliminated.

I have found the pipe vice stand of my invention highly practicable in its construction and operation. The stand is stable and solid in its mounting by virtue of the abutment of the upper end portions of front legs 7 and 8 with the abutment faces 3a and 4a, while a wide range of adjustment of the angle of the supporting plane of the tilting top or platform is assured by virtue of the free movement of the third leg 15 beneath the tiltable top or platform. The entire stand is collapsible to the position illustrated in Fig. 4 and the flexible chain 17 used as a binding means for tying the legs together.

I realize that modifications in the form of construction of the vice stand of my invention may be made and I desire that it be understood that no limitations upon my invention are intended other than may be imposed by the scope of the appended claims.

What I claim as new and desire to secure by Letters Patent of the United States, is as follows:

1. A tiltable folding vice stand comprising a top member having a depending peripheral skirt and a multiplicity of sets of integral lugs projecting in planes normal to the plane of the top of said top member, supporting legs pivoted in said sets of lugs for mounting said top member in a selected plane, a depending lug connected with the skirt of said top member at the front thereof intermediate two of said sets of lugs, an adjustable member pivotally connected to one of said supporting legs and engageable with said depending lug for controlling the angular plane of said top member with respect to the positions of said supporting legs, and in which two of said sets of lugs have an abutment stop between the said lugs forming limiting abutments for the supporting legs pivoted in the said sets of lugs while the set of lugs in which said last mentioned supporting leg is pivoted is free of obstruction permitting said last mentioned supporting leg to swing in a plane extending intermediate the aforesaid supporting legs between limits formed by said depending lug and the peripheral edge of the rear skirt on said top member.

2. A tiltable folding vice stand comprising a top member having a depending peripheral skirt and a multiplicity of sets of integral lugs projecting in planes normal to the plane of the top of said top member, supporting legs pivoted in said sets of lugs for mounting said top member in a selected plane, a depending lug connected with the skirt of said top member at the front thereof intermediate two of said sets of lugs, an adjustable member pivotally connected to one of said supporting legs and engageable with said depending lug for controlling the angular plane of said top member with respect to the positions of said supportings legs, and in which two of said sets of lugs have an abutment stop between the said lugs formed by an angularly inclined wall integral with the material of the top member extending from the undersurface of the top member to the front peripheral skirt and constituting an abutment stop for the supporting legs pivoted in the said sets of lugs while the set of lugs in which said last mentioned supporting leg is pivoted is free of obstruction permitting said last mentioned supporting leg to swing in a plane extending intermediate the aforesaid supporting legs between limits formed by said depending lug and the peripheral edge of the rear skirt on said top member.

References Cited in the file of this patent

UNITED STATES PATENTS

| Number | Name | Date |
|---|---|---|
| 960,916 | Heiser | June 7, 1910 |
| 1,426,531 | Albinson | Aug. 22, 1922 |
| 1,726,662 | Goff | Sept. 3, 1929 |
| 1,812,967 | Long | July 7, 1931 |
| 1,866,023 | Goolsbee | July 5, 1932 |
| 1,897,449 | Trowbridge | Feb. 13, 1933 |